United States Patent
Yamane et al.

(10) Patent No.: US 10,022,626 B2
(45) Date of Patent: Jul. 17, 2018

(54) INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD, FOR PERFORMING AUGMENTED REALITY

(71) Applicant: Nintendo Co., Ltd., Kyoto (JP)

(72) Inventors: Tomoyoshi Yamane, Kyoto (JP); Hirotoshi Ishibai, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 407 days.

(21) Appl. No.: 14/631,313

(22) Filed: Feb. 25, 2015

(65) Prior Publication Data

US 2015/0265922 A1    Sep. 24, 2015

(30) Foreign Application Priority Data

Mar. 18, 2014  (JP) .................................. 2014-055071

(51) Int. Cl.
| A63F 13/00 | (2014.01) |
|---|---|
| A63F 13/525 | (2014.01) |
| A63F 13/213 | (2014.01) |
| A63F 13/803 | (2014.01) |
| A63F 13/335 | (2014.01) |

(52) U.S. Cl.
CPC .......... *A63F 13/525* (2014.09); *A63F 13/213* (2014.09); *A63F 13/335* (2014.09); *A63F 13/803* (2014.09)

(58) Field of Classification Search
None
See application file for complete search history.

(56) References Cited

U.S. PATENT DOCUMENTS

| 2012/0032955 A1* | 2/2012 | Matsuda | G06F 3/04815 345/419 |
| 2014/0002359 A1* | 1/2014 | Weising | G09G 5/08 345/158 |
| 2015/0052221 A1* | 2/2015 | Yoon | H04W 4/008 709/217 |

FOREIGN PATENT DOCUMENTS

JP    2012-178069    9/2012

OTHER PUBLICATIONS

H. Kato et. al., "An Augmented Reality System and its Calibration based on Marker Tracking", TVRSJ, vol. 4, No. 4, (1999), with its partial English translation, 10 pages.

\* cited by examiner

*Primary Examiner* — Kee M Tung
*Assistant Examiner* — Yanna Wu
(74) *Attorney, Agent, or Firm* — Nixon & Vanderhye PC

(57) ABSTRACT

First placement information for placing a first virtual object based on a first reference is transmitted, and the first virtual object is displayed in a first captured image based on the first reference and the first placement information. On the other hand, the transmitted first placement information is acquired, and the first virtual object is displayed in a second captured image based on a second reference and the first placement information.

11 Claims, 9 Drawing Sheets

F I G. 2
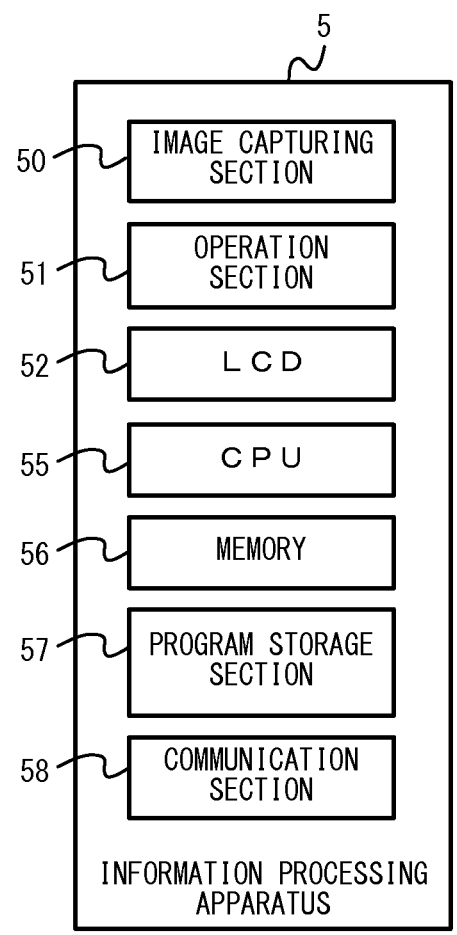

F I G. 7
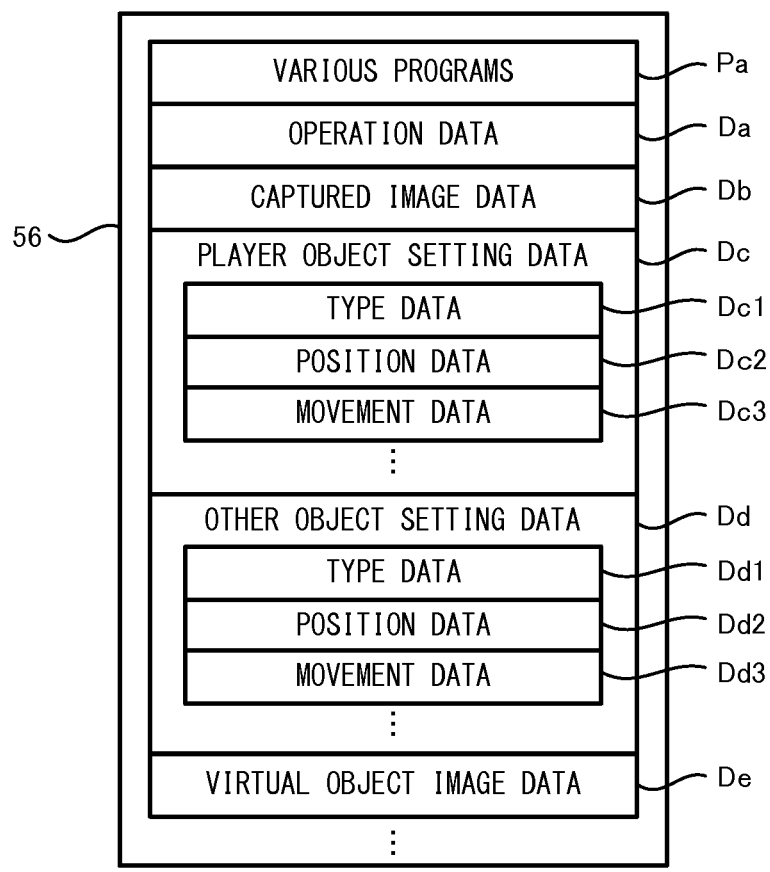

INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD, FOR PERFORMING AUGMENTED REALITY

CROSS REFERENCE TO RELATED APPLICATION

The disclosure of Japanese Patent Application No. 2014-055071, filed on Mar. 18, 2014, is incorporated herein by reference.

FIELD

The technology shown here relates to an information processing system, an information processing apparatus, a storage medium having stored therein an information processing program, and an information processing method, and in particular, relates to an information processing system, an information processing apparatus, and an information processing method for, for example, performing predetermined processing based on a captured image, and a storage medium having stored therein an information processing program for, for example, performing predetermined processing based on a captured image.

BACKGROUND AND SUMMARY

Conventionally, there is a technique for detecting a predetermined image capturing target from an image (a captured image) captured by image capturing means such as a camera and displaying a virtual object in accordance with the detected image capturing target. For example, in the above technique, in augmented reality technology, an image recognition process is performed on a marker included in a captured image captured by a camera. If the marker has been detected, a virtual object is combined with the captured image based on the marker position, and the combined image is displayed.

The above technique, however, merely displays a virtual object corresponding to an image capturing target. Thus, there is room for improvement in displaying a virtual object in a more interesting manner.

Therefore, it is an object of an exemplary embodiment to provide an information processing system, an information processing apparatus, and an information processing method that are capable of enhancing interest for a user, and a storage medium having stored therein an information processing program capable of enhancing interest for a user.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of an information processing system according to an exemplary embodiment, an information processing system includes at least a first information processing apparatus and a second information processing apparatus capable of communicating with the first information processing apparatus. Each of the first information processing apparatus and the second information processing apparatus comprising one or more processors, The one or more processors of the first information processing apparatus are configured to: as first captured image acquisition, acquire a first captured image captured by a first image capturing apparatus; as first reference recognition, recognize a first reference for placing a first virtual object in the first captured image; as first placement information setting, set first placement information for placing the first virtual object based on the first reference; as first transmission, transmit the first placement information to the second information processing apparatus; and as first display control, place the first virtual object in the first captured image based on the first reference and the first placement information and display the first captured image on a first display apparatus. The one or more processors of the second information processing apparatus are configured to: as first acquisition, acquire the first placement information transmitted from the first information processing apparatus; as second captured image acquisition, acquire a second captured image obtained by capturing, using a second image capturing apparatus, a place different from a place captured by the first image capturing apparatus; as second reference recognition, recognize a second reference for at least placing the first virtual object in the second captured image; and as second display control, place the first virtual object in the second captured image based on the second reference and the first placement information and display the second captured image on a second display apparatus.

Based on the above, a first virtual object displayed in a first captured image in a first display apparatus is also displayed in a second captured image in a second display apparatus. Further, based on the placement of the first virtual object displayed in the first captured image, the placement of the first virtual object displayed in the second captured image is controlled. This makes it possible to enhance interest for a user. Further, in each of the places in the real world captured by a first image capturing apparatus and a second image capturing apparatus, it is possible to generate a common space where a virtual object is placed.

In addition, the one or more processors of the second information processing apparatus may be further configured to: set second placement information for placing a second virtual object based on the second reference; and transmit the second placement information to the first information processing apparatus. In the second display control, the second virtual object may be further placed in the second captured image based on the second reference and the second placement information, and the second captured image may be displayed on the second display apparatus. The one or more processors of the first information processing apparatus may be further configured to acquire the second placement information transmitted from the second information processing apparatus. In the first display control, the second virtual object may be further placed in the first captured image based on the first reference and the second placement information, and the first captured image may be displayed on the first display apparatus.

Based on the above, a second virtual object displayed in the second captured image in the second display apparatus is also displayed in the first captured image in the first display apparatus. Further, based on the placement of the second virtual object displayed in the second captured image, the placement of the second virtual object displayed in the first captured image is controlled. Thus, in each of the places in the real world captured by the first image capturing apparatus and the second image capturing apparatus, it is possible to generate a common space where the same virtual object of which the placement is controlled by each information processing apparatus is placed. This makes it possible to further enhance interest for the user.

In addition, in the first display control, the first virtual object may be placed in the captured first captured image based on the first placement information, the second virtual object may be placed in the captured first captured image based on the acquired second placement information, and the placed first captured image may be displayed in real time on the first display apparatus. In the second display control, the second virtual object may be placed in the captured second captured image based on the second placement information, the first virtual object may be placed in the captured second captured image based on the acquired first placement information, and the placed second captured image may be displayed in real time on the second display apparatus.

Based on the above, the first virtual object controlled by a first information processing apparatus and the second virtual object controlled by a second information processing apparatus are displayed in real time on the same display apparatus. This makes it possible to further enhance interest for the user.

In addition, the placement information may be information indicating a position and a direction at and in which the virtual object is placed in the captured image based on the first reference, and may also be information indicating a position and a direction at and in which the virtual object is placed in the captured image based on the second reference, using the same information.

Based on the above, it is possible to place a virtual object displayed in the first captured image based on a first reference, at the same position and in the same direction also in the second captured image based on a second reference.

In addition, in the first reference recognition, if an image obtained with a predetermined marker as a subject is included in the first captured image, an image of the marker may be recognized as the first reference. In the second reference recognition, if an image obtained with a predetermined marker as a subject is included in the second captured image, an image of the marker may be recognized as the second reference.

Based on the above, a predetermined marker is placed in the real world, whereby it is possible to easily prepare a reference for placing a virtual object.

In addition, in the first placement information setting, the first placement information may be set by setting a placement position of the first virtual object such that a state of a real world viewed from a first-person point of view of the first virtual object is the first captured image.

Based on the above, a real world image viewed from the first-person point of view of a virtual object of which the placement is controlled by an information processing apparatus itself is displayed. This makes it possible to enhance the reality of operating the virtual object.

In addition, in the first transmission, if the first information processing apparatus is located at a first particular place and the second information processing apparatus is located at a second particular place, the first placement information may be allowed to be transmitted to the second information processing apparatus. In the first acquisition, if the first information processing apparatus is located at the first particular place and the second information processing apparatus is located at the second particular place, the first placement information transmitted from the first information processing apparatus may be allowed to be acquired.

Based on the above, this effectively motivates a user of a first information processing apparatus and a user of a second information processing apparatus to visit particular places different from each other.

In addition, the information processing system may further include at least a third information processing apparatus including one or more processors. In addition to the second information processing apparatus, at least the third information processing apparatus may be located at the second particular place. In the first transmission, the first placement information may be transmitted to the second information processing apparatus and the third information processing apparatus. The one or more processors of the third information processing apparatus may be configured to: as third acquisition, acquire the first placement information transmitted from the first information processing apparatus; as third captured image acquisition, acquire a third captured image obtained by capturing the second particular place using a third image capturing apparatus; as third reference recognition, recognize the second reference as a reference for placing the first virtual object in the third captured image; and as third display control, place the first virtual object in the third captured image based on the second reference and the first placement information and display the third captured image on a third display apparatus.

Based on the above, it is possible to construct an environment where the display of the first virtual object to be displayed on a display apparatus of each of a plurality of information processing apparatuses located at a second particular place is controlled by an information processing apparatus located at a first particular place.

In addition, the first information processing apparatus located at the first particular place and the second information processing apparatus located at the second particular place may be configured to communicate with each other via a predetermined network.

Based on the above, it is possible to easily connect to a particular place via a predetermined network. This makes it possible to generate, in each place via the network, a common space where a virtual object is placed.

In addition, the exemplary embodiment may be carried out in the forms of an information processing apparatus, a storage medium having stored therein an information processing program, and an information processing method.

According to the exemplary embodiment, it is possible to enhance interest for a user. Further, in each of the places in the real world captured by a first image capturing apparatus and a second image capturing apparatus, it is possible to generate a common space where a virtual object is placed.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 2 is a block diagram showing a non-limiting example of the configuration of each information processing apparatus 5;

FIG. 5 is a diagram showing a non-limiting example where virtual objects OBJa to OBJd are displayed on the information processing apparatus 5a;

FIG. 7 is a diagram showing non-limiting examples of main data and programs stored in a memory 56 of the information processing apparatus 5;

DETAILED DESCRIPTION OF NON-LIMITING EXAMPLE EMBODIMENTS

Figure 1:
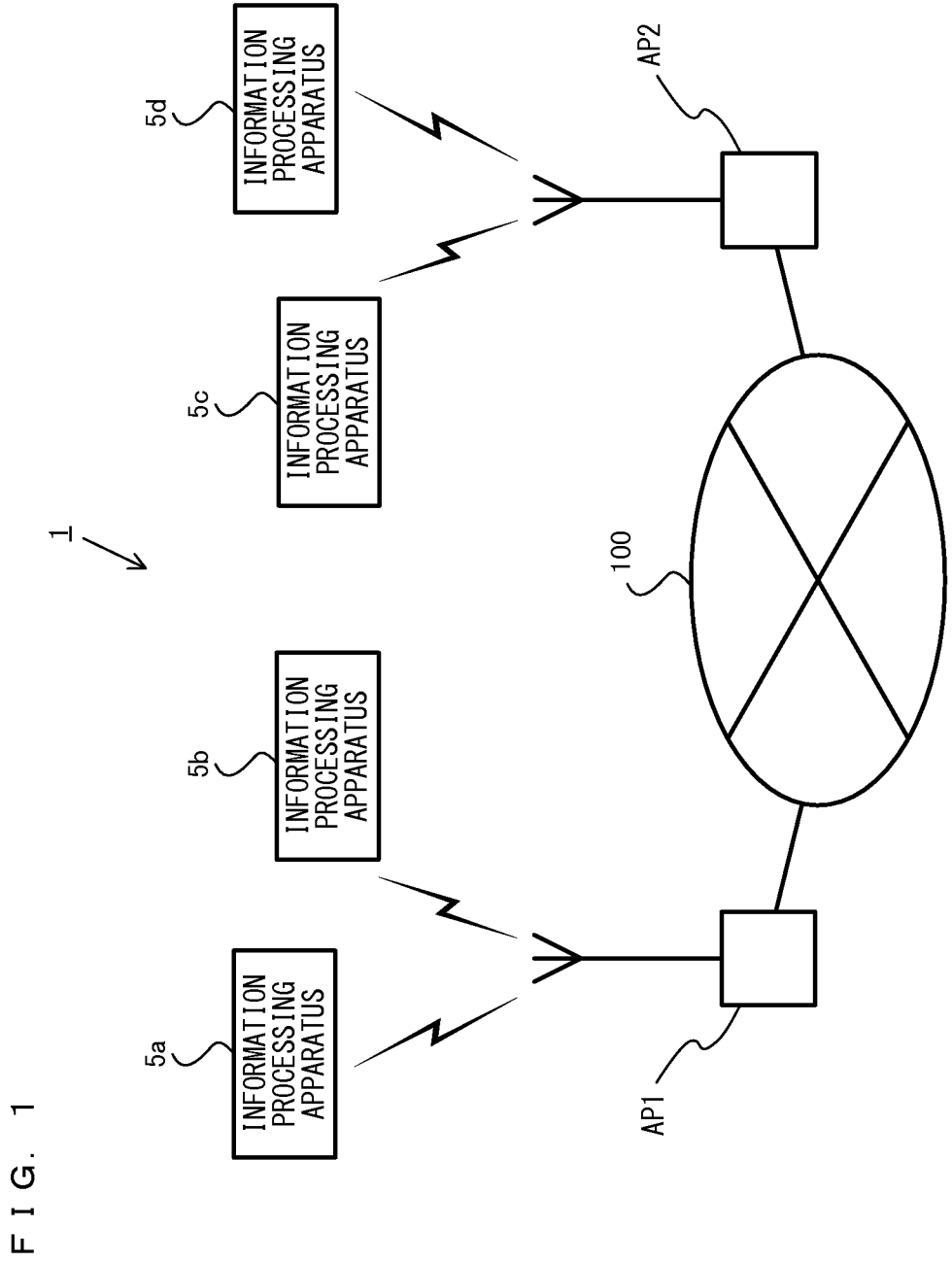
FIG. 1 is a block diagram showing a non-limiting example of an information processing system 1, which includes a plurality of information processing apparatuses 5a to 5d.

With reference to FIGS. 1 and 2, a description is given of an information processing system including an information processing apparatus for executing an information processing program according to an exemplary embodiment and the information processing apparatus. It should be noted that FIG. 1 is a block diagram showing an example of an information processing system 1, which includes a plurality of information processing apparatuses 5a to 5d. FIG. 2 is a block diagram showing an example of the configuration of each information processing apparatus 5.

As shown in FIG. 1, in the information processing system 1, the plurality of information processing apparatuses 5a and 5b are placed remotely from the plurality of information processing apparatuses 5c and 5d. The information processing system 1 is constructed by the connection between both groups of information processing apparatuses via an access point AP1, an access point AP2, and a network 100 (e.g., the Internet). For example, each of the information processing apparatuses 5a and 5b is configured to connect to the network 100 via the access point AP1 using wireless communication. Further, each of the information processing apparatuses 5c and 5d is configured to connect to the network 100 via the access point AP2 using the wireless communication. Then, the information processing apparatuses 5a and 5b and the information processing apparatuses 5c and 5d establish connections with the others via the network 100 and thereby can communicate wirelessly with the others. Further, also in each group of information processing apparatuses (between the information processing apparatuses 5a and 5b and between the information processing apparatuses 5c and 5d in the example of FIG. 1), the information processing apparatuses 5 are configured to connect to each other via the access point AP1 or AP2 using wireless communication.

For example, each information processing apparatus 5 can execute a program stored in a storage medium such as an exchangeable memory card or an exchangeable optical disk, or received from a server or another apparatus. The information processing apparatus 5 may be a handheld game apparatus, or may be a device such as a general personal computer, a mobile phone, or a PDA (Personal Digital Assistant).

As shown in FIG. 2, the information processing apparatus 5 includes an image capturing section 50, an operation section 51, an LCD 52, a CPU 55, a memory 56, a program storage section 57, a communication section 58, and the like. It should be noted that the information processing apparatus 5 may be composed of one or more apparatuses including: an information processing apparatus having at least the CPU 55; and another apparatus.

The CPU 55 is an example of information processing means (a computer) for executing various types of information processing. The CPU 55 has the function of, as the various types of information processing, receiving data transmitted from another information processing apparatus 5 via the communication section 58, and executing processing based on the data, and the like. Further, the CPU 55 has the function of, as the various types of information processing, executing the process of creating data (e.g., player object setting data) to be transmitted to another information processing apparatus 5, and transmitting the data via the communication section 58, and the like. For example, the above functions are achieved by the CPU 55 executing a predetermined program. In the exemplary embodiment, the information processing apparatus 5 can play a predetermined game by communicating with another information processing apparatus 5 via a particular access point AP. If the information processing apparatus 5 has become able to communicate with the particular access point AP using the communication section 58, the information processing apparatus 5 communicates with the other information processing apparatus 5 and starts the game.

In addition, the CPU 55 has the function of, as the various types of information processing, performing processing based on a captured image captured by the image capturing section 50 and an operation of a user performed on the operation section 51, and the like. In the exemplary embodiment, if a predetermined marker image is included in a captured image captured by the image capturing section 50, the CPU 55 performs a display control process for combining a virtual object with the captured image at a placement position based on the display position of the marker image, and displaying the combined image on the LCD 52.

The memory 56 stores various types of data for use when the CPU 55 performs the above processing. The memory 56 is, for example, a memory accessible by the CPU 55.

The program storage section 57 stores a program. The program storage section 57 may be any storage device (storage medium) accessible by the CPU 55. For example, the program storage section 57 may be a storage device provided in the information terminal apparatus 5 having the CPU 55, or may be a storage medium detachably attached to the information terminal apparatus 5 having the CPU 55. Alternatively, the program storage section 57 may be a storage device (a server or the like) connected to the CPU 55 via a network. The CPU 55 may load a part or all of the program into the memory 56 at appropriate timing and execute the loaded program.

The operation section 51 is an input apparatus that can be operated by the user. The operation section 51 may be any input apparatus. For example, the operation section 51 may be an input apparatus such as an operation button, a stick, or a touch panel, or may include an orientation sensor such as a gyro sensor or an acceleration sensor.

The LCD 52 is an example of a display section included in the information terminal apparatus 5 and displays an image in accordance with an instruction from the CPU 55. It should be noted that the LCD 52 may be a display apparatus capable of displaying a stereoscopically visible image by displaying a left-eye image and a right-eye image using substantially the same display area.

For example, the image capturing section 50 includes a camera fixedly provided on the outer surface of a housing of the information processing apparatus 5 such that the image capturing direction of the camera is the depth direction of a screen of the LCD 52. The camera is connected to the CPU 55, captures an image in accordance with an instruction from the CPU 55, and outputs the captured image data to the CPU 55. The camera includes an imaging device (e.g., a CCD image sensor, a CMOS image sensor, or the like) having a predetermined resolution, and a lens. It should be noted that the lens may have a zoom mechanism. Further, the camera may form a stereo camera including two image capturing sections fixedly provided such that the image capturing directions of the image capturing sections are parallel in the left-right direction.

In the exemplary embodiment, the information processing apparatus 5 transmits and receives communication packets via the network 100, thereby communicating with another information processing apparatus 5 connected to a particular access point AP. The information processing apparatus 5 can be operated by the user of the information processing apparatus 5. The information processing apparatus 5 transmits data for controlling an image to be displayed on the other information processing apparatus 5 and performs processing corresponding to data transmitted from the other information processing apparatus 5. For example, the information processing apparatus 5 performs the process of generating data (player object setting data) for controlling a virtual object to be combined with a captured image and displayed on the LCD 52 of the information processing apparatus 5, and transmitting the generated data to the other information processing apparatus 5 connected to the particular access point AP. Further, the information processing apparatus 5 receives player object setting data transmitted from the other information processing apparatus 5 and acquires information about a virtual object set in the other information processing apparatus 5 (e.g., information indicating the type, the position, the direction, the moving velocity, and the like of the virtual object).

Figure 3:
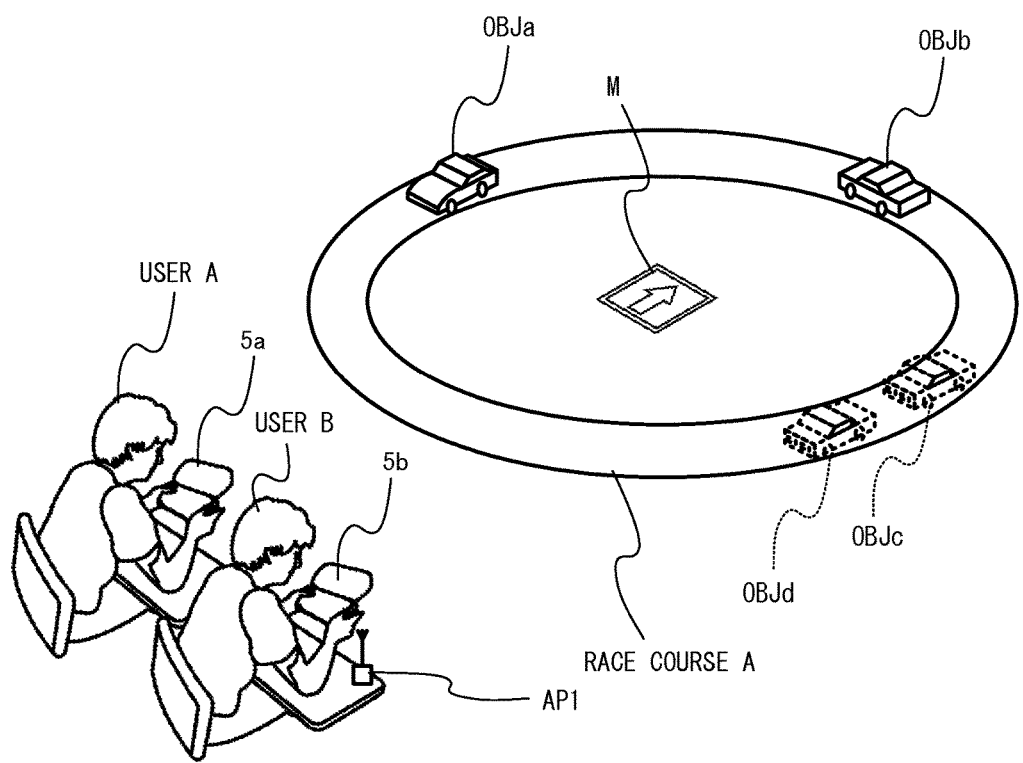
FIG. 3 is a diagram showing a non-limiting example of the state where the plurality of information processing apparatuses 5a and 5b are operated by connecting to an access point AP1 in the information processing system 1.
Figure 4:
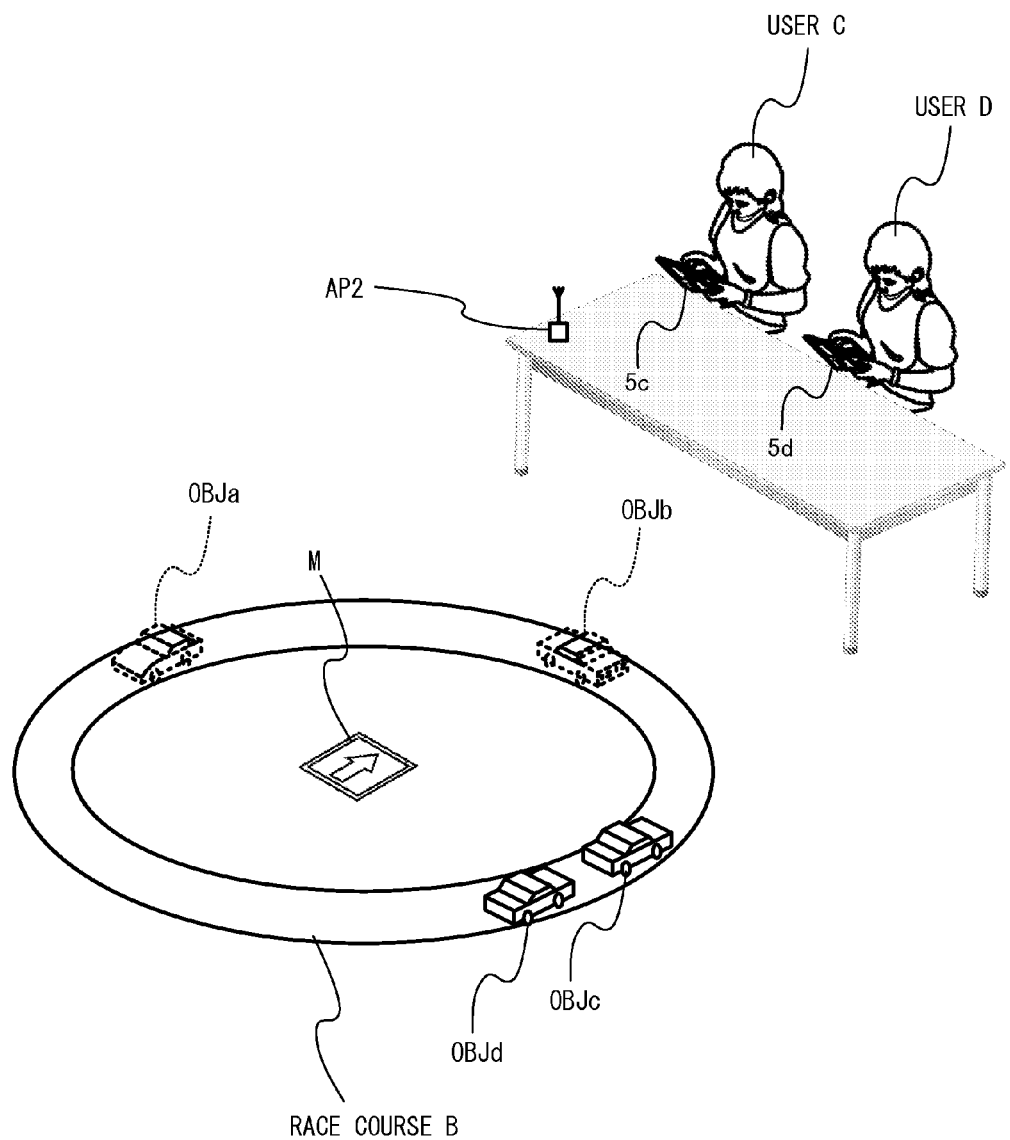
FIG. 4 is a diagram showing a non-limiting example of the state where the plurality of information processing apparatuses 5c and 5d are operated by connecting to an access point AP2 in the information processing system 1.
Figure 5:
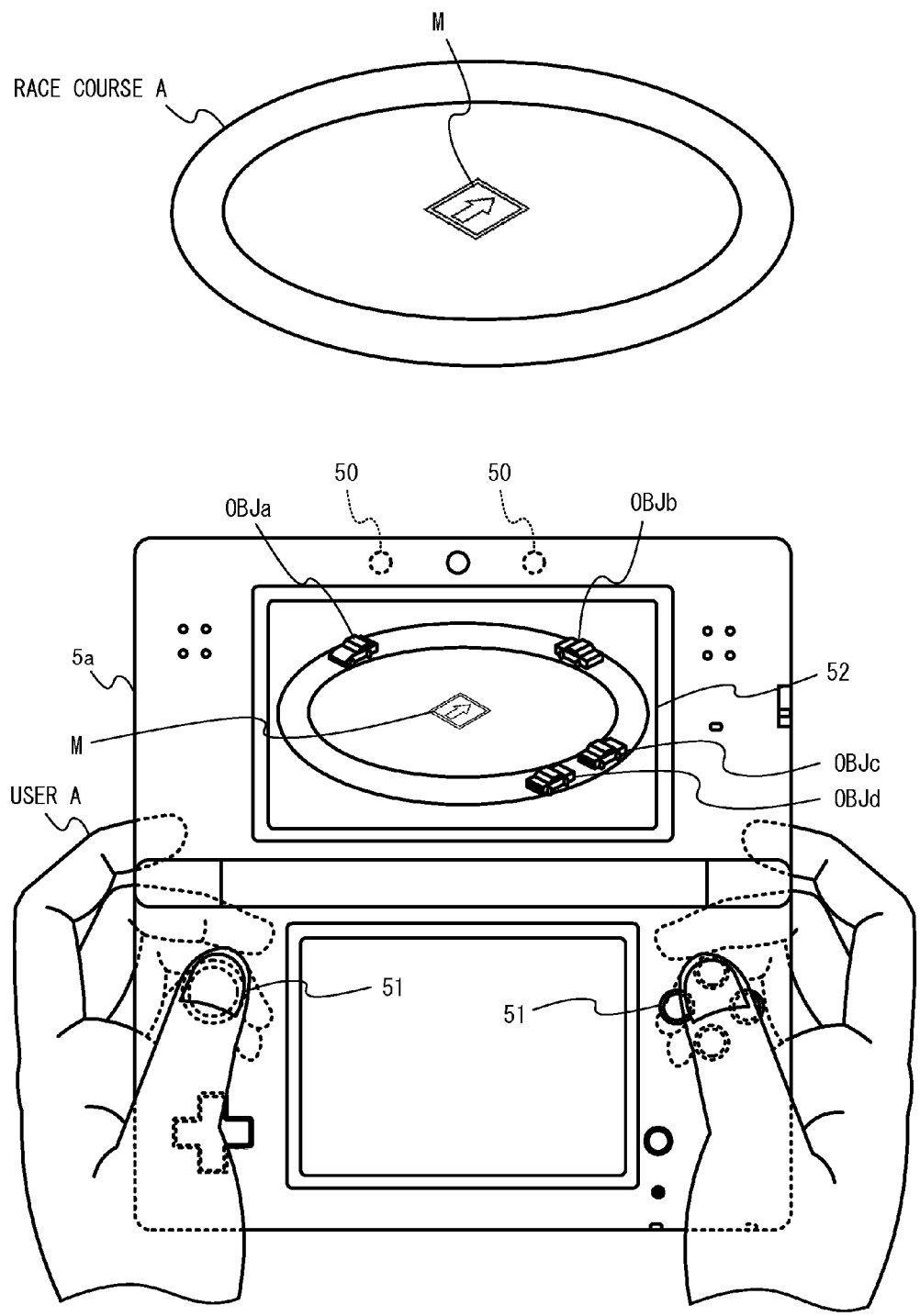
Figure 6:
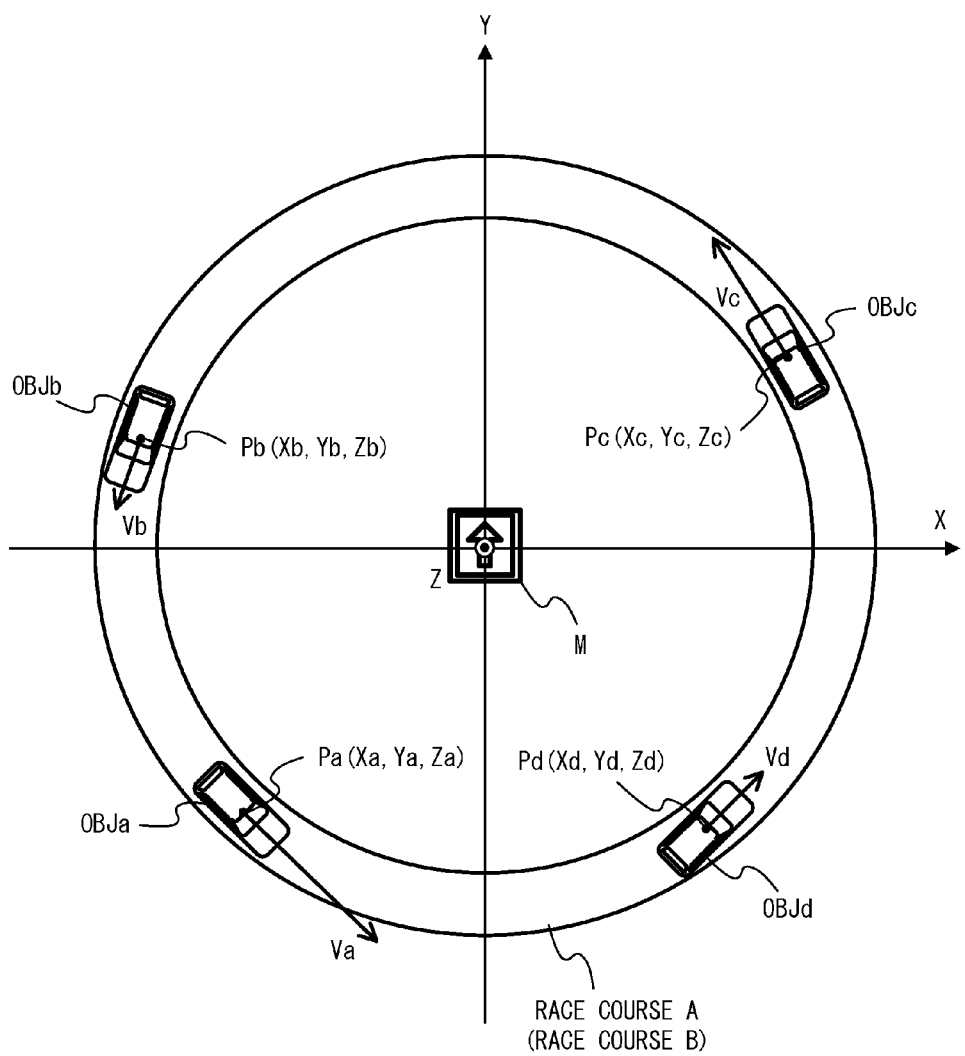
FIG. 6 is a diagram illustrating a non-limiting example of player object setting data set for each of the virtual objects OBJa to OBJd.

Next, with reference to FIGS. 3 to 6, a description is given of an example of an overview of the processing performed in the information processing system 1, before the description of specific processing performed by the information processing apparatus 5. FIG. 3 is a diagram showing an example of the state where the plurality of information processing apparatuses 5a and 5b are operated by connecting to an access point AP1 in the information processing system 1. FIG. 4 is a diagram showing an example of the state where the plurality of information processing apparatuses 5c and 5d are operated by connecting to an access point AP2 in the information processing system 1. FIG. 5 is a diagram showing an example where virtual objects OBJa to OBJd are displayed on the information processing apparatus 5a. FIG. 6 is a diagram illustrating an example of player object setting data set for each of the virtual objects OBJa to OBJd.

In FIG. 3, a particular access point AP1 is installed in a place in the real world. Further, on the floor surface of the place where the access point AP1 is installed, a race course A is drawn in which a marker M is placed. In the marker M, as an example, a predetermined figure or letter is drawn in a rectangular frame. Then, a user A, who operates the information processing apparatus 5a, and a user B, who operates the information processing apparatus 5b, are visiting the place where the access point AP1 is installed. It should be noted that virtual objects OBJa to OBJd, which are running the race course A shown in FIG. 3, conceptually represent images that can be viewed through the LCD 52 of the information processing apparatus 5a or the LCD 52 of the information processing apparatus 5b, and will be described later.

In FIG. 4, a particular access point AP2 is installed in a place different from the place where the access point AP1 is installed (e.g., a place remote from or adjacent to the place where the access point AP1 is installed). Further, also on the floor surface of the place where the access point AP2 is installed, a race course B is drawn in which a marker M is placed. Here, the race course B has the same shape as that of the race course A, and the race course B and the marker M are placed so as to have the same positional relationship as that between the race course A and the marker M. Further, in the exemplary embodiment, the marker M placed at the place where the access point AP2 is installed is the same as the marker M placed at the place where the access point AP1 is installed. Then, a user C, who operates the information processing apparatus 5c, and a user D, who operates the information processing apparatus 5d, are visiting the place where the access point AP2 is installed. It should be noted that also virtual objects OBJa to OBJd, which are running the race course B shown in FIG. 4, conceptually represent images that can be viewed through the LCD 52 of the information processing apparatus 5c or the LCD 52 of the information processing apparatus 5d, and will be described later.

If each of the users A to D of the information processing apparatuses 5a to 5d has captured the real world using the image capturing section 50, the CPU 55 performs image processing such as pattern matching on a captured image acquired from the image capturing section 50, thereby determining whether or not the marker M is included in the captured image. Then, if the marker M has been captured by the image capturing section 50, the captured image in which the marker M is included as a subject is displayed as a real world image on the LCD 52, and the virtual object OBJ is displayed on the LCD 52 in a combined manner at a position based on the display position of the marker image M included in the real world image.

For example, as shown in FIG. 5, if the user A of the information processing apparatus 5a has captured the real world including the marker M on the floor surface, using the outer camera 501, the virtual objects OBJa to OBJd are displayed on the LCD 52 in a combined manner at positions based on the display position of the marker image M included in the real world image (e.g., on the race course A).

In the exemplary embodiment, the virtual object OBJa to be combined with a captured image is a player object operated by the user A of the information processing apparatus 5a, and the type and the action of the virtual object OBJa are controlled in accordance with the operation of the user A. For example, the information processing apparatus 5a places the virtual object OBJa at a size corresponding to the size of the captured marker M and on a virtual plane including the marker M such that the position of the marker M is the origin. Then, the information processing apparatus 5a combines the virtual object OBJa with a real world image. Then, the information processing apparatus 5a causes the virtual object OBJa to move on the virtual plane in accordance with a user operation on the operation section 51 of the information processing apparatus 5a.

On the other hand, the type and the action of each of the virtual objects OBJb to OBJd to be combined with the captured image are controlled based on data transmitted from the other information processing apparatus 5 via the access points AP1 and/or AP2. Here, each of the access points AP1 and AP2 has a communication range where the access point can communicate wirelessly with each information processing apparatus 5. If each information processing apparatus 5 has entered the communication range of the access point AP1 or the communication range of the access point AP2, the process of establishing the connection between the information processing apparatus 5 and the access point AP1 or AP2 by wireless communication is performed automatically or in accordance with a user operation. Then, transmission data (player object setting data) set in the information processing apparatus 5 connected to the particular access point AP1 is transmitted to another information processing apparatus 5 connected to the particular access point AP1 or AP2. Further, transmission data set in the information processing apparatus 5 connected to the particular access point AP2 is transmitted to another information processing apparatus 5 connected to the particular access point AP1 or AP2. That is, in the examples shown in FIGS. 3 and 4, transmission data of the information processing apparatus 5a connected to the particular access point AP1 is transmitted to the information processing apparatuses 5c and 5d connected to the particular access point AP2 and the information processing apparatus 5b connected to the particular access point AP1. Further, transmission data of the information processing apparatus 5c connected to the particular access point AP2 is transmitted to the information processing apparatuses 5a and 5b connected to the particular access point AP1 and the information processing apparatus 5d connected to the particular access point AP2.

Each information processing apparatus 5 transmits data (player object setting data) representing the type, the position, the direction, the moving velocity, and the like of the virtual object OBJ, which is the player object operated by the user of the information processing apparatus 5 itself, to another information processing apparatus 5 that is the transmission destination. For example, in the example of FIG. 5, in addition to the player object (the virtual object OBJa) operated by the user A, the virtual objects OBJb to OBJd operated by the users B to D, respectively, are displayed on the LCD 52 of the information processing apparatus 5a in accordance with the player object setting data transmitted from the information processing apparatuses 5b to 5d. In such a case, the information processing apparatus 5a transmits the player object setting data representing the type, the position, the direction, the moving velocity, and the like of the virtual object OBJa, which is the player object operated by the user of the information processing apparatus 5a itself, to the information processing apparatuses 5b to 5d. Further, the information processing apparatus 5a also receives the player object setting data representing the type, the position, the direction, the moving velocity, and the like of each of the virtual objects OBJb to OBJd from the other information processing apparatuses 5b to 5d.

For example, as shown in FIG. 6, information indicating the position, the direction, the moving velocity, and the like of each virtual object OBJ set by the player object setting data is calculated using a marker coordinate system. Here, the marker coordinate system is a coordinate system where the position of the marker M in the real world is the origin, and the vertical direction and the horizontal direction of the marker M and the direction normal to the marker M are axes. For example, a position Pa of the virtual object OBJa, which is operated by the user A, is represented by coordinates (Xa, Ya, Za) of the marker coordinate system. Further, the direction and the moving velocity of the virtual object OBJa are represented by a vector Va of the marker coordinate system. Similarly, a position Pb, the direction, and the moving velocity of the virtual object OBJb, which is operated by the user B, are represented by coordinates (Xb, Yb, Zb) and a vector Vb of the marker coordinate system. Further, a position Pc, the direction, and the moving velocity of the virtual object OBJc, which is operated by the user C, are represented by coordinates (Xc, Yc, Zc) and a vector Vc of the marker coordinate system. Further, a position Pd, the direction, and the moving velocity of the virtual object OBJd, which is operated by the user D, are represented by coordinates (Xd, Yd, Zd) and a vector Vd of the marker coordinate system.

The coordinates and the vectors represented by such a marker coordinate system can be transformed into coordinates in a real world image (an image capturing coordinate system) using a marker-camera transformation matrix calculated from the positional relationship between the image capturing section 50 and the marker M based on the position and the orientation of the marker M in a captured image. Here, the marker-camera transformation matrix is a matrix that reflects the position and the orientation of the image capturing section 50 calculated based on the position and the orientation of the marker M in the captured image. More accurately, the marker-camera transformation matrix is a coordinate transformation matrix for transforming coordinates represented by the marker coordinate system into coordinates represented by the image capturing coordinate system based on the position and the orientation of the image capturing section 50 calculated based on the position and the orientation of the marker M in the captured image. Here, in AR (Augmented Reality) technology using a computer, the marker-camera transformation matrix for transforming the marker coordinate system into the image capturing section coordinate system is specified as the view matrix of a virtual camera, whereby it is possible to combine a real world image (a captured image) with a CG image (a virtual world image in which the virtual objects OBJa to OBJd are placed based on the marker coordinate system).

As described above, a real world image combined with a virtual space defined using the marker M as a reference is displayed on the LCD 52 of each of the information processing apparatuses 5a and 5b connected to the particular access point AP1, and in the virtual space, also the virtual objects controlled by the information processing apparatuses 5 placed at another place are placed. On the other hand, a real world image combined with the same virtual space defined using the marker M as a reference is also displayed on the LCD 52 of each of the information processing apparatuses 5c and 5d connected to the particular access point AP2, and in the virtual space, also the virtual objects controlled by the information processing apparatuses 5 placed at another place are placed. That is, through the LCD 52 of each information processing apparatus 5, the same virtual space defined using the marker M as a reference is generated at each of the place where the particular access point AP1 is placed and the place where the particular access point AP2 is placed. Further, in each virtual space, the same virtual objects OBJ are controlled to move in similar actions. As described above, the information processing system 1 can generate a common virtual space at separate places and display a real world image combined with the common virtual space on the information processing apparatuses 5 at each place. Thus, using the information processing system 1, it is possible to perform in real time an AR game where images obtained by capturing different places are combined with a common virtual space, and the combined images are used. Further, an access point that allows such an event is narrowed down to the particular access points AP1 and AP2.

This effectively motivates a user to visit a particular place (the installation locations of the particular access point AP1 or AP2).

It should be noted that image data of each virtual object OBJ may be appropriately transmitted from the information processing apparatus 5 that operates the virtual object OBJ, in accordance with the fact that the information processing apparatus 5 has connected to an access point AP, or may be stored in advance in an information processing apparatus 5 that is the transmission destination. As an example, if parts of each virtual object OBJ are stored in advance in each information processing apparatus 5 and when the type and/or the action of the virtual object OBJ are set, selection information of each part and information indicating the position, the direction, and the size of the part are set, and data representing the settings is transmitted to another information processing apparatus 5. Then, in the information processing apparatus 5 that is the transmission destination, the parts of the virtual object OBJ stored in advance are placed based on the received data, thereby generating image data of the virtual object OBJ based on the settings of the transmission source.

In addition, the virtual object OBJ, which appears by detecting the marker M from a captured image, may be, as an example, configured to be displayed on the LCD 52 only if the information processing apparatus 5 has connected to a particular access point AP. Further, as another example, only if the information processing apparatus 5 has connected to a particular access point AP, a special object may be displayed as the virtual object OBJ on the LCD 52. In the first case, the virtual object OBJ is not displayed only by capturing the marker M. Thus, to display the virtual object OBJ, the user needs to enter the communication range of a particular access point AP where the marker M is installed. Also in the second case, the special object is not displayed as the virtual object OBJ only by capturing the marker M. Thus, to use the special object, the user needs to enter the communication range of a particular access point AP where the marker M is installed. Thus, in either case, the particular access point AP and the information processing apparatus 5 need to establish communication with each other. This effectively motivates the user to visit a particular place (the installation location of the particular access point AP).

In addition, the action of each virtual object OBJ may be set in an information processing apparatus 5 that is the transmission destination. For example, if an information processing apparatus 5 that is the transmission destination has received operation data per se for operating the virtual object OBJ (the player object), the information processing apparatus 5 that is the transmission destination may calculate the action of the virtual object OBJ from the operation data and set the action of the virtual object OBJ of the transmission source.

In addition, the virtual object OBJ operated by the user of each information processing apparatus 5 may not be displayed on the LCD 52 of the information processing apparatus 5. As a first example, the virtual space viewed from the first-person point of view of the virtual object OBJ (the player object) operated by the user of the information processing apparatus 5 may be combined with a real world image, and the combined image may be displayed on the LCD 52 of the information processing apparatus 5. In this case, the position and the direction of the player object in the virtual space may be determined in accordance with the positional relationship between the marker M and the image capturing section 50 in the real world. It should be noted that the positional relationship between the marker M and the image capturing section 50 in the real world may be calculated by analyzing a captured image captured by the image capturing section 50, or may be calculated based on the orientation and the motion of the main body of the information processing apparatus 5 calculated by an orientation sensor (an acceleration sensor or a gyro sensor) or the like provided in the information processing apparatus 5. As a second example, the user of the information processing apparatus 5 may only view the state of the virtual space using the information processing apparatus 5 without operating the virtual object OBJ. In this case, the information processing apparatus 5 may not transmit player object setting data to another information processing apparatus 5. The information processing apparatus 5, however, receives player object setting data from the other information processing apparatus 5. Then, on the LCD 52 of the information processing apparatus 5, a real world image is displayed which is combined with the virtual space where the virtual object OBJ corresponding to the received player object setting data is placed. The user of the information processing apparatus 5 is an audience that sits back and watches the virtual space.

In addition, in the above information processing system 1, the same marker M is placed at each place in the real world to place each virtual object OBJ in a real world image and combine the virtual object OBJ with the real world image. Alternatively, a different marker may be placed at each place, or the marker M per se may not be provided. As a first example, if the marker M is not installed, a reference for placing the virtual object OBJ in a real world image obtained by capturing each place may be provided. For example, a predetermined shape or a predetermined object in the real world (e.g., the upper surface of a rectangular table) may be used as the reference. In this case, the predetermined shape or the predetermined object is detected from a captured image by performing image processing such as pattern matching. Then, it is possible, based on the detected reference, to place the virtual object OBJ in a real world image. As a second example, if the information processing apparatus 5 has a GPS (Global Positioning System) function, so-called location-based AR may be used, in which the virtual object OBJ is placed in a real world image using position information acquired from the GPS and additional information (e.g., information indicating the azimuth orientation of the information processing apparatus 5 detected by a magnetic sensor, or information indicating the orientation and the action of the main body of the information processing apparatus 5 detected by an acceleration sensor or a gyro sensor). As a third example, if the information processing apparatus 5 has the function of detecting the radio field intensity of an access point when communicating wirelessly with the access point, the virtual object OBJ may be placed in a real world image using as the above position information an access position calculated based on the radio field intensity of each access point detected by this function and the installation position of the access point.

In addition, in the above exemplary embodiment, an example has been described where on the floor surface of the place where the access point AP1 is installed, the race course A is drawn in which the marker M is placed, and also on the floor surface of the place where the access point AP2 is installed, the race course B having the same shape is drawn in which the marker M is placed. Alternatively, each of the race courses A and B may be combined with a real world image, and the combined image may be displayed on the LCD 52. For example, similarly to each virtual object OBJ, a race course is drawn as a background image in the virtual space of the marker coordinate system where the virtual object OBJ is placed, and an image of the race course is also transformed into coordinates (the image capturing coordinate system) in a real world image using the marker-camera transformation matrix. Thus, it is possible to combine the race course with the real world image and display the combined image.

In addition, in the above exemplary embodiment, the type and the action of each virtual object OBJ are set in accordance with a user input (an operation input or the like). Alternatively, another display form regarding the virtual object OBJ may be set. For example, in accordance with a user input, the size, the color, the density, and the brightness of a virtual object OBJ, the number of virtual objects OBJ, and the like may be set.

In addition, in the above exemplary embodiment, a particular access point is set, thereby setting the range where the particular access point can communicate, as a particular place to which a user is to be led. Alternatively, the particular place may be set by another method. As an example, if the information processing apparatus 5 has a GPS function, it may be determined, based on the position on earth calculated by the GPS function, whether or not the information processing apparatus 5 is accessing an access point from a particular place. As another example, if the information processing apparatus 5 has the function of detecting the radio field intensity of an access point when communicating wirelessly with the access point, it may be determined, based on an access position calculated based on the radio field intensity of each access point detected by this function and the installation position of the access point, whether or not the information processing apparatus 5 is accessing an access point from a particular place. Alternatively, using an apparatus for transmitting position information indicating the installation position of the apparatus (e.g., a device for transmitting the position information using a beacon) itself, it may be determined whether or not the information processing apparatus 5 is accessing an access point from a particular place. For example, if the information processing apparatus 5 has received position information from another apparatus, it may be determined, based on the received position information, whether or not the information processing apparatus 5 is accessing an access point from a particular place.

In addition, in the above exemplary embodiment, a form has been used in which the information processing apparatuses 5 placed in the range where the same access point AP can communicate transmit and receive data to and from each other via the access point AP. Alternatively, the information processing apparatuses 5 may directly transmit and receive data to and from each other.

In addition, in the above information processing system 1, the process of combining an image of each virtual object OBJ with a real world image (a captured image) is performed by an apparatus for controlling the display of the combined image. Alternatively, an apparatus controlling the virtual object OBJ may perform this process. For example, an apparatus for controlling the display of the combined image transmits a captured image captured by the apparatus to an apparatus controlling the virtual object OBJ. Then, the apparatus controlling the virtual object OBJ performs a combination process for displaying the virtual object OBJ in the transmitted captured image and transmits an image subjected to the combination process to the apparatus having transmitted the captured image.

Next, the details of the processing performed by the information processing apparatus 5 are described. First, with reference to FIG. 7, main data used in the processing is described. It should be noted that FIG. 7 is a diagram showing examples of the main data and programs stored in the memory 56 of the information processing apparatus 5.

As shown in FIG. 7, the following are stored in the data storage area of the memory 56: operation data Da; captured image data Db; player object setting data Dc; other object setting data Dd; virtual object image data De; and the like. It should be noted that the memory 56 may store, as well as the data shown in FIG. 7, data necessary for the processing, such as data used in an application to be executed. Further, in the program storage area of the memory 56, various programs Pa included in the information processing program are stored.

The operation data Da is data set in accordance with a user operation on the information processing apparatus 5 and is data representing the content of the operation performed on the operation section 51. The captured image data Db is data representing a captured image captured in real time by the image capturing section 50 and is sequentially updated every time an image is captured.

The player object setting data Dc is data set for the player object (the virtual object OBJ) operated by the user of the information processing apparatus 5 and includes type data Dc1, position data Dc2, movement data Dc3, and the like. The type data Dc1 is data used to set the type of the player object (the virtual object OBJ). The position data Dc2 is data representing the position, in the virtual space, of the player object (the virtual object OBJ) to be combined with a real world image and is, for example, represented by coordinate data of the marker coordinate system. The movement data Dc3 is data representing the moving direction and the moving velocity of the player object (the virtual object OBJ) in the virtual space and is, for example, represented by vector data of the marker coordinate system.

The other object setting data Dd is data received from another information processing apparatus 5 and includes type data Dd1, position data Dd2, movement data Dd3, and the like. The type data Dd1 is data used to set the type of the virtual object OBJ controlled by the other information processing apparatus 5. The position data Dd2 is data representing the position, in the virtual space, of the virtual object OBJ controlled by the other information processing apparatus 5 and is, for example, represented by coordinate data of the marker coordinate system. The movement data Dc3 is data representing the moving direction and the moving velocity, in the virtual space, of the virtual object OBJ controlled by the other information processing apparatus 5 and is, for example, represented by vector data of the marker coordinate system.

The virtual object image data De is data for generating an image of the virtual object OBJ and displaying the generated image on the LCD 52.

Figure 8:
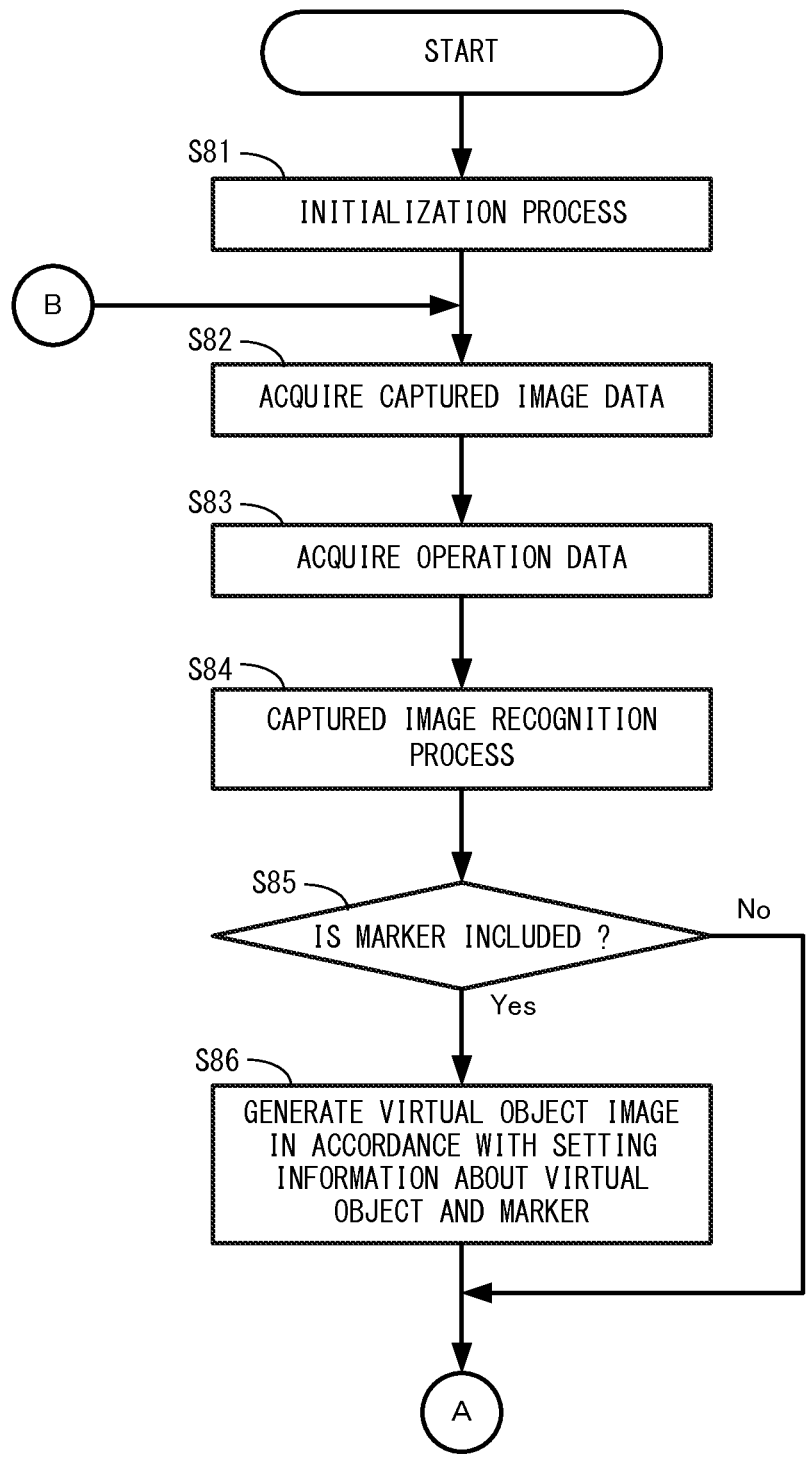
FIG. 8 is a flow chart showing a non-limiting example of the first half of information processing performed by the information processing apparatus 5 (a CPU 55)
Figure 9:
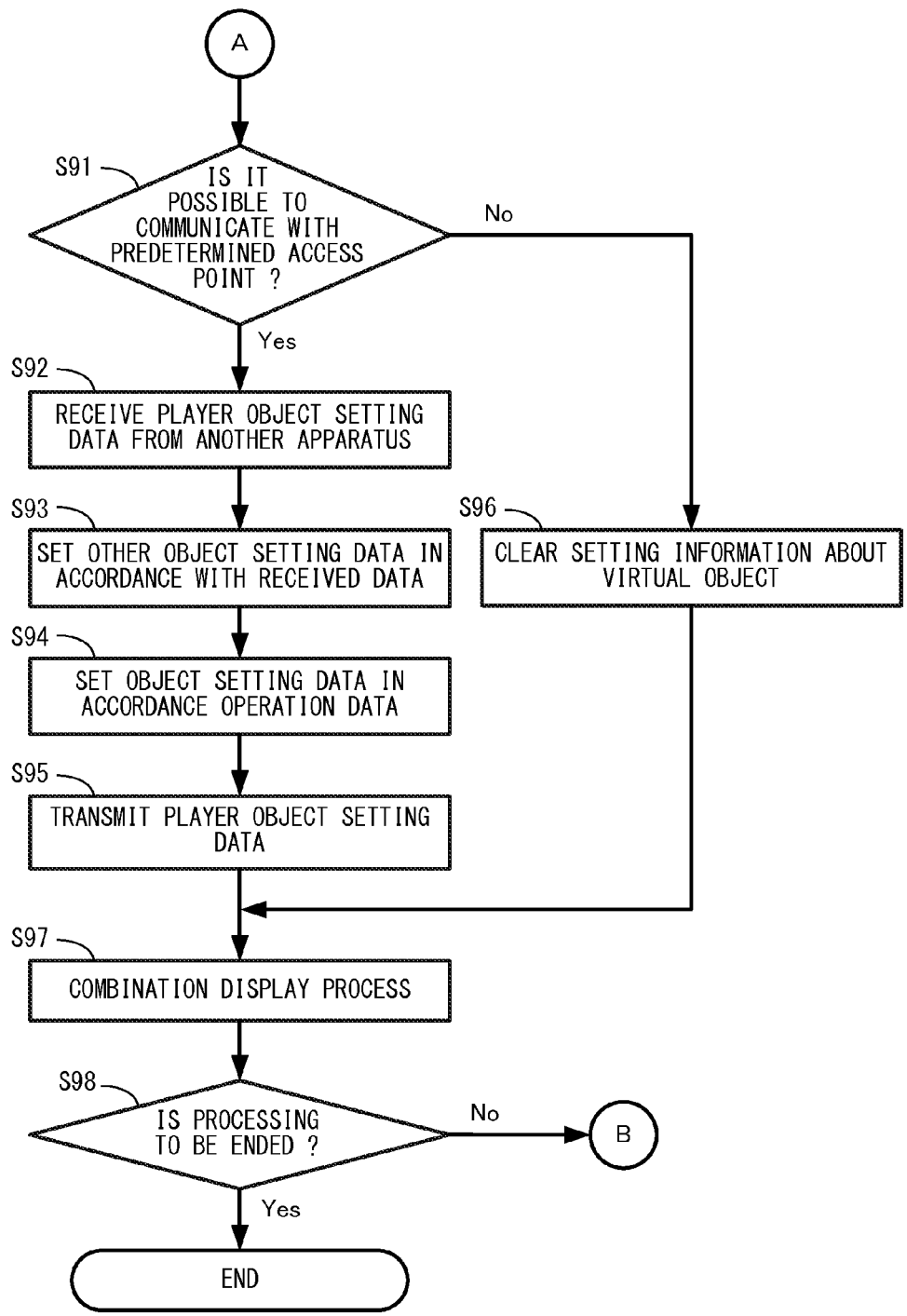
FIG. 9 is a flow chart showing a non-limiting example of the second half of the information processing performed by the information processing apparatus 5 (the CPU 55).

Next, with reference to FIGS. 8 and 9, the details of the processing performed by the information processing apparatus 5 are described. It should be noted that FIG. 8 is a flow chart showing an example of the first half of information processing performed by the information processing apparatus 5 (the CPU 55). FIG. 9 is a flow chart showing an example of the second half of the information processing performed by the information processing apparatus 5 (the CPU 55). Here, in the flow charts shown in FIGS. 8 and 9, a description is given mainly of, in the processing performed by the information processing apparatus 5 included in the above information processing system 1, the process of, if a predetermined marker has been detected in a captured image, causing the virtual object OBJ to appear and displaying the resulting image on the LCD 52. Detailed descriptions of other processes not directly related to these processes are omitted. In the exemplary embodiment, a series of processes shown in FIGS. 8 and 9 are performed by the CPU 55 executing the information processing program stored in the program storage section 57.

It should be noted that the information processing shown in FIGS. 8 and 9 is started at any timing. For example, in accordance with the fact that the user has given an instruction to start the information processing, a connection with an access point may be established, and the execution of the information processing program may be started. At this time, a part or all of the information processing program is loaded into the memory 56 at appropriate timing and executed by the CPU 55. Consequently, the series of processes shown in FIGS. 8 and 9 is started. It should be noted that the information processing program is stored in advance in the program storage section 57 included in the information processing apparatus 5. Alternatively, in another exemplary embodiment, the information processing program may be acquired from a storage medium attachable to and detachable from the information processing apparatus 5 and stored in the memory 56, or may be acquired from another apparatus via a network such as the Internet and stored in the memory 56.

In addition, the processes of all the steps in the flow charts shown in FIGS. 8 and 9 are merely illustrative. Thus, the processing order of the steps may be changed, or another process may be performed in addition to and/or instead of the processes of all the steps, so long as similar results are obtained. Further, in the exemplary embodiment, the CPU 55 may perform the processes of some of the steps in the flow charts, and a processor or a dedicated circuit other than the CPU 55 may perform the processes of the other steps. Yet alternatively, a processor or a dedicated circuit other than the CPU 55 may perform the processes of all the steps in the flow charts.

Referring to FIG. 8, the CPU 55 performs an initialization process in the information processing (step 81), and the processing proceeds to the next step. For example, in the above step 81, the CPU 55 initializes parameters used in the information processing.

Next, the CPU 55 acquires captured image data representing a captured image output from the image capturing section 50 (step 82), and the processing proceeds to the next step. For example, the CPU 55 stores newly acquired captured image data representing a captured image, as the captured image data Db in the memory 56.

Next, the CPU 55 acquires operation data representing the content of the operation performed on the operation section 51 (step 83), and the processing proceeds to the next step. For example, the CPU 55 stores newly acquired operation data as the operation data Da3 in the memory 56.

Next, the CPU 55 performs a captured image recognition process using the captured image data acquired in the above step 82 (step 84), thereby determining whether or not a marker M is included in the captured image represented by the captured image data (step 85). Then, if the marker M is included in the captured image, the processing proceeds to step 86. If, on the other hand, the marker M is not included in the captured image, the processing proceeds to step 91 (see FIG. 9). A description is given below of an example of the captured image recognition process performed in the above steps 84 and step 85.

For example, the CPU 55 performs an image recognition process, using a pattern matching technique or the like, on the captured image represented by the captured image data, thereby determining whether or not the marker M is included in the captured image. Then, if the marker M is included in the camera image, the CPU 55 assumes that the marker M exists in the real world in the image capturing range of the image capturing section 50. Then, based on the position and the orientation of the marker M in the captured image, the CPU 55 calculates the positional relationship between the image capturing section 50 and the marker M. As an example, the CPU 55 recognizes the position and/or the orientation of the marker M in the captured image, thereby calculating the marker-camera transformation matrix, and stores image recognition result data representing the marker-camera transformation matrix in the memory 56. As described above, in AR technology using a computer, the marker-camera transformation matrix for transforming the marker coordinate system into the image capturing coordinate system is specified as the view matrix of a virtual camera, whereby it is possible to combine a real world image (a captured image) with a CG image (a virtual world image).

In step 86, in accordance with setting information about each virtual object and the marker M subjected to the image recognition, the CPU 55 generates a virtual object image representing a virtual object OBJ to appear, and the processing proceeds to step 91 (see FIG. 9). For example, in accordance with the type of the marker M subjected to the image recognition and setting information set in the player object setting data Dc and the other object setting data Dd (e.g., the type data Dc1, the movement data Dc3, the type data Dd1, and the movement data Dd3), the CPU 55 sets the type, the orientation, the action, and the like of a virtual character PC to appear. Then, with reference to the position data Dc2 and the position data Dd2, the CPU 55 places each virtual object OBJ in the virtual space defined by the marker coordinate system and changes the size of the virtual object OBJ where necessary. It should be noted that if information is not set in the player object setting data Dc or the other object setting data Dd, a virtual object image representing a virtual object OBJ determined in advance in accordance with the type of the marker M subjected to image recognition may be generated, or the process of generating a virtual object image may be skipped.

Then, the CPU 55 generates as a virtual object image the virtual object OBJ viewed from the virtual camera and stores the virtual object image in the virtual object image data De of the memory 55. For example, the CPU 54 specifies the marker-camera transformation matrix as the view matrix of the virtual camera, and thereby can display a CG model (the virtual object OBJ) represented by the marker coordinate system at the same position as the location where the CG model would be displayed on the LCD 52 if the CG model existed in the real world (e.g., a position defined by the position data Dc2 and the position data Dd2, using the marker M in the captured image as a reference). That is, in a display image to be displayed on the LCD 52, it is possible to display the virtual object OBJ placed in the virtual space defined by the marker coordinate system, as if the virtual character PC existed in association with the marker M in the real world.

Referring to FIG. 9, the CPU 55 determines whether or not the information processing apparatus 5 can communicate with a predetermined access point (e.g., the access point AP1 in the example of FIG. 3, or the access point AP2 in the example of FIG. 4) (step 91). For example, the CPU 55 searches for an access point by so-called passive scan or active scan, using an identifier for connecting to an access point. Next, if the predetermined access point has been detected and a connection with the access point has been established, the CPU 55 sets an apparatus set as a communication partner to and from which data is transmitted and received via the access point. Then, the CPU 55 starts communication. Then, the processing proceeds to step 92. On the other hand, if the predetermined access point has not been detected, or if a connection with the predetermined access point cannot be established, the processing proceeds to step 96. It should be noted that the above communication partner to and from which data is transmitted and received via the access point is another information processing apparatus 5 that is the transmission destination in the examples of FIGS. 1, 3, and 4. Thus, in the case of the information processing apparatus 5a, the information processing apparatuses 5b to 5d are communication partners.

In step 92, the CPU 55 receives player object setting data transmitted from the set apparatus that is the communication partner, and the processing proceeds to the next step. For example, the CPU 55 receives player object setting data that is setting information about the virtual object OBJ controlled by each apparatus that is the communication partner.

Next, the CPU 55 sets other object setting data in accordance with the data received in the above step 92 (step 93), and the processing proceeds to the next step. For example, using the player object setting data received from each communication partner, the CPU 55 updates the other object setting data Dd of the communication partner.

Next, in accordance with the operation data Da, the CPU 55 sets setting information about the player object (the virtual object OBJ) operated by the user of the information processing apparatus 5 itself (step 94), and the processing proceeds to the next step. For example, if the operation data Da indicates the operation of setting or changing the type of the player object, the CPU 55 sets the type of the player object based on the content of the operation and updates the type data Dc1 using the set type. Further, if the operation data Da indicates the operation of causing the player object to take action (move), then in accordance with the content of the operation, the CPU 55 causes the player object to take action (move) in the virtual space, thereby setting the orientation (the action direction) and the action velocity (the moving velocity). Then, the CPU 55 updates the position data Dc2 and the movement data Dc3 using the position, the orientation (the action direction), and the action velocity (the moving velocity) after the action (after the movement). It should be noted that the position data Dc2 and the movement data Dc3 may be managed by information based on the above marker coordinate system.

Next, the CPU 55 transmits the player object setting data to the set apparatus that is the communication partner (step 95), and the processing proceeds to the next step. For example, the CPU 55 performs the process of setting the player object setting data Dc as transmission data and transmitting the transmission data to the set apparatus that is the communication partner.

On the other hand, if the predetermined access point has not been detected, or if a connection with the predetermined access point cannot be established (if the determination is negative in step 91), the CPU 55 clears the setting information about the virtual object OBJ (step 96), and the processing proceeds to step 97. For example, the CPU 55 erases the player object setting data Dc and the other player object setting data Dd as the setting information about the virtual object OBJ.

In step 97, the CPU 55 performs a combination display process, and the processing proceeds to the next step. For example, if the marker M has been captured, the CPU 55 generates a display image by combining the captured image (a real world image) acquired in the above step 82 with the virtual object image generated in the above step 86 and displays the display image on the LCD 52.

Specifically, the CPU 55 draws the captured image acquired in the above step 82 in a predetermined storage area (hereinafter referred to as a "frame buffer") in a VRAM for temporarily storing an image to be supplied to the LCD 52. Then, if the determination is affirmative in the above step 85, the CPU 55 overwrites in the frame buffer the virtual object image stored in the memory 56 (i.e., an image of the virtual space viewed from the virtual camera). This combines the virtual object image with the captured image (the real world image) drawn in the frame buffer. Then, the image drawn in the frame buffer is supplied to the LCD 52 at predetermined timing and displayed on the LCD 52. It should be noted that in the virtual object image, the background of the virtual space is transparent. Thus, the virtual object image is combined with the real world image, thereby generating an image in which the virtual object OBJ looks as if existing in the real world image. It should be noted that if the determination is negative in the above step 85, the CPU 55 draws only the captured image in the frame buffer and displays the drawn image on the LCD 52.

Next, the CPU 55 determines whether or not the processing is to be ended (step 98). Examples of conditions for ending the processing include the fact that the user has performed the operation of ending the processing. If the processing is not to be ended, the CPU 55 returns to the above step 82 and repeats the process thereof. If the processing is to be ended, the CPU 55 ends the processing indicated by the flow chart. Thereafter, the CPU 55 repeatedly performs a series of processes of steps 82 to 97 until it is determined in step 98 that the processing is to be ended.

It should be noted that in the above information processing system 1, a form has been used in which apparatuses for transmitting and receiving data directly communicate data via access points. Alternatively, data may be communicated via yet another apparatus (e.g., a relay server) or the like.

In addition, the above descriptions are given of the processing procedure used when a single information processing apparatus 5 performs information processing. Alternatively, another apparatus may perform at least some of the processing steps in the information processing. For example, if the information processing apparatus 5 is further configured to communicate with another apparatus (e.g., another server, another game apparatus, or another mobile terminal), the other apparatus may cooperate to perform the processing steps of the information processing. Another apparatus may thus perform at least some of the processing steps in the information processing, thereby enabling processing similar to the above information processing. Further, the above information processing can be performed by a processor or the cooperation of a plurality of processors, the processor or the plurality of processors included in an information processing system including at least one information processing apparatus. Further, in the above exemplary embodiment, the processing indicated in the above flow charts is performed by the CPU 55 of the information processing apparatus 5 executing a predetermined program. Alternatively, a part or all of the processing indicated in the flow charts may be performed by a dedicated circuit included in the information processing apparatus 5.

Here, the above variations make it possible to achieve the exemplary embodiment also by a system form such as so-called cloud computing, or a system form such as a distributed wide area network or a local area network. For example, in a system form such as a distributed local area network, it is possible to execute the processing between a stationary information processing apparatus (a stationary game apparatus) and a handheld information processing apparatus (a handheld game apparatus) by the cooperation of the apparatuses. It should be noted that, in these system forms, there is no particular limitation on which apparatus performs the process of each step of the above processing. Thus, it goes without saying that it is possible to achieve the exemplary embodiment by sharing the processing in any manner.

In addition, the processing orders, the setting values, the conditions used in the determinations, and the like that are used in the above information processing are merely illustrative. Thus, it goes without saying that the exemplary embodiment can be achieved also with other orders, other values, and other conditions.

In addition, each of the above programs may be supplied to the information processing apparatus 5 not only through an external storage medium such as the external memory, but also through a wired or wireless communication link. Further, the program may be stored in advance in a non-volatile storage device included in the information processing apparatus 5. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the above various functions by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, an information processing system, an information processing apparatus, an information processing program, and an information processing method in order, for example, to further enhance interest for a user.

What is claimed is:

1. An information processing system including at least a first information processing apparatus and a second information processing apparatus capable of communicating with the first information processing apparatus,
    each of the first information processing apparatus and the second information processing apparatus comprising one or more processors,
    the one or more processors of the first information processing apparatus configured to:
        as first captured image acquisition, acquire a first captured image captured by a first image capturing apparatus;
        as first reference recognition, recognize a first reference for placing a first virtual object in the first captured image;
        as first placement information setting, set first placement information for placing the first virtual object based on the first reference;
        as first transmission, transmit the first placement information to the second information processing apparatus; and
        as first display control, place the first virtual object in the first captured image based on the first reference and the first placement information and display the first captured image on a first display apparatus,
    the one or more processors of the second information processing apparatus configured to:
        as first acquisition, acquire the first placement information transmitted from the first information processing apparatus;
        as second captured image acquisition, acquire a second captured image obtained by capturing, using a second image capturing apparatus, a place different from a place captured by the first image capturing apparatus;
        as second reference recognition, recognize a second reference for at least placing the first virtual object in the second captured image; and
        as second display control, place the first virtual object in the second captured image based on the second reference and the first placement information and display the second captured image on a second display apparatus, wherein
    the first placement information is information indicating a position and a direction at and in which the first virtual object is placed in the first captured image based on the first reference, and is also information indicating a position and a direction at and in which the first virtual object is placed in the second captured image based on the second reference, using the same information.

2. The information processing system according to claim 1, wherein
    the one or more processors of the second information processing apparatus are further configured to:
        set second placement information for placing a second virtual object based on the second reference; and
        transmit the second placement information to the first information processing apparatus,
    in the second display control, the second virtual object is further placed in the second captured image based on the second reference and the second placement information, and the second captured image is displayed on the second display apparatus,
    the one or more processors of the first information processing apparatus are further configured to acquire the second placement information transmitted from the second information processing apparatus, and in the first display control, the second virtual object is further placed in the first captured image based on the first reference and the second placement information, and the first captured image is displayed on the first display apparatus.

3. The information processing system according to claim 2, wherein in the first display control, the first virtual object is placed in the captured first captured image based on the first placement information, the second virtual object is placed in the captured first captured image based on the acquired second placement information, and the placed first captured image is displayed in real time on the first display apparatus, and in the second display control, the second virtual object is placed in the captured second captured image based on the second placement information, the first virtual object is placed in the captured second captured image based on the acquired first placement information, and the placed second captured image is displayed in real time on the second display apparatus.

4. The information processing system according to claim 1, wherein in the first reference recognition, if an image obtained with a predetermined marker as a subject is included in the first captured image, an image of the marker is recognized as the first reference, and in the second reference recognition, if an image obtained with a predetermined marker as a subject is included in the second captured image, an image of the marker is recognized as the second reference.

5. The information processing system according to claim 1, wherein in the first placement information setting, the first placement information is set by setting a placement position of the first virtual object such that a state of a real world viewed from a first-person point of view of the first virtual object is the first captured image.

6. The information processing system according to claim 1, wherein in the first transmission, if the first information processing apparatus is located at a first particular place and the second information processing apparatus is located at a second particular place, the first placement information is allowed to be transmitted to the second information processing apparatus, and in the first acquisition, if the first information processing apparatus is located at the first particular place and the second information processing apparatus is located at the second particular place, the first placement information transmitted from the first information processing apparatus is allowed to be acquired.

7. The information processing system according to claim 6, further including at least a third information processing apparatus comprising one or more processors, wherein in addition to the second information processing apparatus, at least the third information processing apparatus is located at the second particular place, in the first transmission, the first placement information is transmitted to the second information processing apparatus and the third information processing apparatus, the one or more processors of the third information processing apparatus are configured to:

as third acquisition, acquire the first placement information transmitted from the first information processing apparatus;

as third captured image acquisition, acquire a third captured image obtained by capturing the second particular place using a third image capturing apparatus;

as third reference recognition, recognize the second reference as a reference for placing the first virtual object in the third captured image; and as third display control, place the first virtual object in the third captured image based on the second reference and the first placement information and display the third captured image on a third display apparatus.

8. The information processing system according to claim 6, wherein the first information processing apparatus located at the first particular place and the second information processing apparatus located at the second particular place are configured to communicate with each other via a predetermined network.

9. An information processing apparatus capable of communicating with another apparatus, the information processing apparatus comprising one or more processors configured to:

acquire a first captured image captured by a first image capturing apparatus;

recognize a first reference for placing a first virtual object in the first captured image;

set first placement information for placing the first virtual object based on the first reference;

transmit the first placement information to the other apparatus;

acquire, from the other apparatus, second placement information for placing a second virtual object based on a second reference; and place the first virtual object in the first captured image based on the first reference and the first placement information, place the second virtual object in the first captured image based on the first reference and the second placement information, and display the first captured image on a display apparatus, wherein the first placement information is information indicating a position and a direction at and in which the first virtual object is placed in the first captured image based on the first reference, and is also information indicating a position and a direction at and in which the first virtual object is placed in the second captured image based on the second reference, using the same information.

10. A non-transitory computer-readable storage medium having stored therein an information processing program executed by a computer included in an information processing apparatus capable of communicating with another apparatus, the information processing program causing the computer to execute:

acquiring a first captured image captured by a first image capturing apparatus;

recognizing a first reference for placing a first virtual object in the first captured image;

setting first placement information for placing the first virtual object based on the first reference;

transmitting the first placement information to the other apparatus;

acquiring, from the other apparatus, second placement information for placing a second virtual object based on a second reference; and placing the first virtual object in the first captured image based on the first reference and the first placement information, placing the second virtual object in the first captured image based on the first reference and the second placement information, and displaying the first captured image on a display apparatus, wherein the first placement information is information indicating a position and a direction at and in which the first virtual object is placed in the first captured image based on the first reference, and is also information indicating a position and a direction at and in which the first virtual object is placed in the second captured image based on the second reference, using the same information.

11. An information processing method performed by a processor or cooperation of a plurality of processors, the processor or the plurality of processors included in an information processing system including at least an information processing apparatus capable of communicating with another apparatus, the information processing method comprising:

acquiring a first captured image captured by a first image capturing apparatus;

recognizing a first reference for placing a first virtual object in the first captured image;

setting first placement information for placing the first virtual object based on the first reference;

transmitting the first placement information to the other apparatus;

acquiring, from the other apparatus, second placement information for placing a second virtual object based on a second reference; and placing the first virtual object in the first captured image based on the first reference and the first placement information, placing the second virtual object in the first captured image based on the first reference and the second placement information, and displaying the first captured image on a display apparatus, wherein the first placement information is information indicating a position and a direction at and in which the first virtual object is placed in the first captured image based on the first reference, and is also information indicating a position and a direction at and in which the first virtual object is placed in the second captured image based on the second reference, using the same information.

* * * * *